(12) United States Patent
Takahashi et al.

(10) Patent No.: US 11,007,646 B2
(45) Date of Patent: May 18, 2021

(54) PROGRAMMING ASSISTANCE APPARATUS, ROBOT SYSTEM, AND METHOD FOR GENERATING PROGRAM

(71) Applicant: Kabushiki Kaisha Yaskawa Denki, Kitakyushu (JP)

(72) Inventors: Makoto Takahashi, Kitakyushu (JP); Takuya Fukuda, Kitakyushu (JP); Wataru Watanabe, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 267 days.

(21) Appl. No.: 16/183,747

(22) Filed: Nov. 8, 2018

(65) Prior Publication Data
US 2019/0143524 A1    May 16, 2019

(30) Foreign Application Priority Data
Nov. 10, 2017   (JP) ............................. JP2017-217379

(51) Int. Cl.
*B25J 9/16*    (2006.01)
(52) U.S. Cl.
CPC ............. *B25J 9/1682* (2013.01); *B25J 9/161* (2013.01); *B25J 9/1661* (2013.01);
(Continued)
(58) Field of Classification Search
CPC ........ B25J 9/1682; B25J 9/1661; B25J 9/161; B25J 9/163; B25J 9/1664; B25J 13/02; B25J 9/06; B25J 18/02; B25J 13/06; G05B 2219/39377; G05B 2219/40113; G05B 2219/40518; G05B 2219/33056;
(Continued)

(56) References Cited

U.S. PATENT DOCUMENTS

| 4,835,730 A * | 5/1989 | Shimano ................ B25J 9/1661 |
| | | 700/257 |
| 9,707,680 B1 * | 7/2017 | Jules ...................... B25J 9/1661 |

(Continued)

FOREIGN PATENT DOCUMENTS

| JP | 2016059985 A | 4/2016 |
| WO | 2006043873 A1 | 4/2006 |

OTHER PUBLICATIONS

Extended European Search Report dated Apr. 1, 2019, for corresponding EP application 18202882.9-1205, pp. 1-6.

*Primary Examiner* — Khoi H Tran
*Assistant Examiner* — B M M Hannan
(74) *Attorney, Agent, or Firm* — HEA Law PLLC

(57) ABSTRACT

A programming assistance apparatus includes circuitry. The circuitry generates a first display data to be displayed in a first input area in which to input, for each of a plurality of task groups including a plurality of tasks, a first condition under which at least one robot executes the tasks. The circuitry generates a second display data to be displayed in a second input area in which to input a second condition for an execution order of the plurality of task groups. The circuitry sets the first condition based on an input into the first input area. The circuitry sets the second condition based on an input into the second input area. The circuitry generates, based on the first condition and the second condition, a motion program for causing the at least one robot to execute the plurality of task groups.

20 Claims, 11 Drawing Sheets

(52) U.S. Cl.
CPC .............. *G05B 2219/39377* (2013.01); *G05B 2219/40113* (2013.01); *G05B 2219/40518* (2013.01)

(58) Field of Classification Search
CPC .......... G05B 2219/40202; G05B 19/42; Y10S 901/03; Y10S 901/15; Y10S 901/28
USPC ................ 700/245, 250, 253, 257, 262, 264
See application file for complete search history.

(56) References Cited

U.S. PATENT DOCUMENTS

| | | | |
|---|---|---|---|
| 2005/0080515 A1* | 4/2005 | Watanabe | B25J 9/1671 700/264 |
| 2005/0256610 A1* | 11/2005 | Orita | G05D 1/0251 700/248 |
| 2006/0106471 A1* | 5/2006 | Ikeda | B25J 13/06 700/83 |
| 2006/0217841 A1* | 9/2006 | Matsumoto | B25J 9/1682 700/248 |
| 2006/0229766 A1* | 10/2006 | Setsuda | G05B 19/425 700/245 |
| 2007/0150102 A1 | 6/2007 | Park | |
| 2008/0109114 A1* | 5/2008 | Orita | H02J 7/0027 700/248 |
| 2013/0255426 A1* | 10/2013 | Kassow | B25J 18/00 74/490.03 |
| 2016/0001445 A1* | 1/2016 | Setsuda | B25J 9/1633 700/260 |
| 2016/0075019 A1 | 3/2016 | Tabuchi et al. | |
| 2018/0178389 A1* | 6/2018 | Aiso | B25J 9/1692 |

* cited by examiner

PROGRAMMING ASSISTANCE APPARATUS, ROBOT SYSTEM, AND METHOD FOR GENERATING PROGRAM

CROSS-REFERENCE TO RELATED APPLICATIONS

The present application claims priority under 35 U.S.C. § 119 to Japanese Patent Application No. 2017-217379, filed Nov. 10, 2017. The contents of this application are incorporated herein by reference in their entirety.

BACKGROUND

Field of the Invention

The embodiments disclosed herein relate to a programming assistance apparatus, a robot system, and a method for generating a program.

Discussion of the Background

JP 2016-59985A discloses a work planning device that includes a divider and an adjuster. The divider divides an action executed by a plurality of executors into a plurality of first actions on a single-executor basis. The work planning device generates dependency information that indicates a dependency relationship among a plurality of second actions including the first actions divided by the divider. When the dependency information shows that the second actions include a plurality of third actions executed by the same executor, the adjuster adjusts the start timing of at least one of the third actions.

SUMMARY

According to one aspect of the present disclosure, a programming assistance apparatus includes circuitry. The circuitry is configured to generate a first display data to be displayed in a first input area in which to input, for each of a plurality of task groups including a plurality of tasks, a first condition under which at least one robot executes the tasks. The circuitry is configured to generate a second display data to be displayed in a second input area in which to input a second condition for an execution order in which the plurality of task groups are executed. The circuitry is configured to set the first condition based on an input into the first input area. The circuitry is configured to set the second condition based on an input into the second input area. The circuitry is configured to generate, based on the first condition and the second condition, a motion program for causing the at least one robot to execute the plurality of task groups.

According to another aspect of the present disclosure, a robot system includes at least one robot, circuitry, and a controller. The circuitry is configured to generate a first display data to be displayed in a first input area in which to input, for each of a plurality of task groups including a plurality of tasks, a first condition under which the at least one robot executes the tasks. The circuitry is configured to generate a second display data to be displayed in a second input area in which to input a second condition for an execution order in which the plurality of task groups are executed. The circuitry is configured to set the first condition based on an input into the first input area. The circuitry is configured to set the second condition based on an input into the second input area. The circuitry is configured to generate, based on the first condition and the second condition, a motion program for causing the at least one robot to execute the plurality of task groups. The controller is configured to control the at least one robot based on the motion program generated by the circuitry.

According to the other aspect of the present disclosure, a method for generating a program includes generating a first display data to be displayed in a first input area in which to input, for each of a plurality of task groups including a plurality of tasks, a first condition under which at least one robot executes the tasks. A second display data is generated. The second display data is to be displayed in a second input area in which to input a second condition for an execution order in which the plurality of task groups are executed. The first condition is set based on an input into the first input area. The second condition is set based on an input into the second input area. Based on the first condition and the second condition, a motion program for causing the at least one robot to execute the plurality of task groups is generated.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
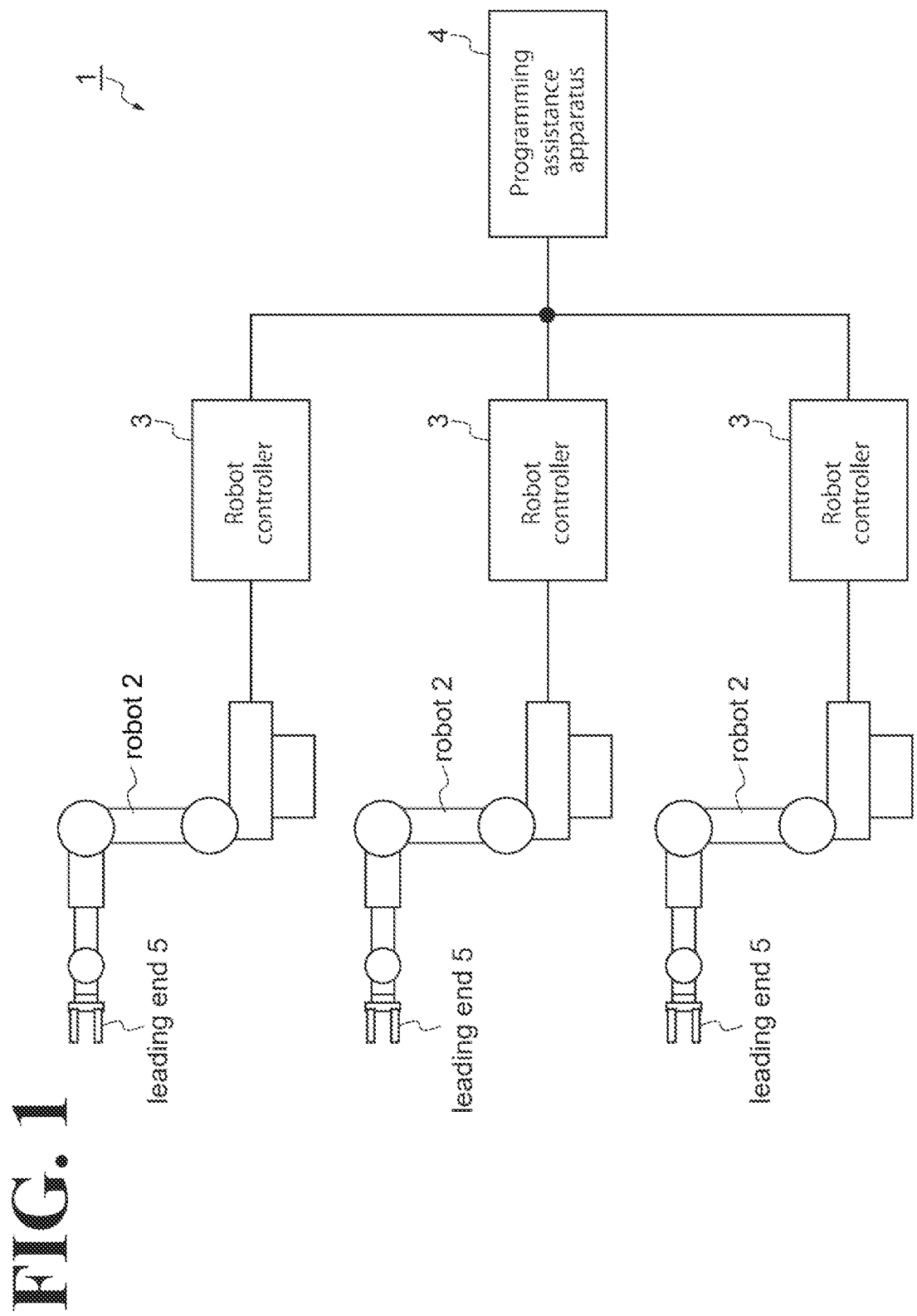
FIG. 1 is a schematic illustrating a configuration of a robot system as a whole.

The embodiments will now be described with reference to the accompanying drawings, wherein like reference numerals designate corresponding or identical elements throughout the various drawings. The robot system according to this embodiment is a system that causes a robot to execute a motion taught by an operator so as to automate various kinds of work such as machining, processing, and assembly.

Robot System

As illustrated in FIG. 1, a robot system 1 includes a plurality of robots 2, a plurality of robot controllers 3, and a programming assistance apparatus 4. The plurality of robot controllers 3 control the plurality of respective robots 2. Each of the plurality of robots 2 is a vertical multi-articular robot having a serial link of multiple axes (for example, six axes or seven axes). At the leading end, 5, of the robot 2, a tool is attachable. Using the tool, the robot 2 is capable of performing various kinds of work. It is to be noted that the robot 2 will not be limited to a six-axis vertical multi-articular robot but may have any other number of axes insofar as the position and posture of the leading end 5 is freely changeable within a predetermined range. For example, the robot 2 may be a seven-axis vertical multi-articular robot that has one redundant axis in addition to six axes. The plurality of robots 2 are capable of working on a workpiece in approximately the same manner when the workpiece is arranged at correct position.

Each of the robot controllers 3 controls the corresponding robot 2 based on a motion program generated in advance. The motion program includes, for example, a motion path for the leading end 5 of the robot 2. The motion path is information that specifies a transition over time of the position and posture of the leading end 5. For example, the motion path includes a plurality of position-posture target values aligned in time order. In order to make the position and posture of the leading end 5 match the position-posture target values, the robot controller 3 calculates joint angle target values (target values of the angles of the joints of the robot 2) and controls the robot 2 based on the joint angle target values.

The programming assistance apparatus 4 assists in generating a motion program. The programming assistance apparatus 4 executes; generating a first display data to be displayed in a first input area in which to input, for each of a plurality of task groups, a first condition under which the robot 2 executes a task, the plurality of task groups including a plurality of subsidiary tasks; generating a second display data to be displayed in a second input area in which to input a second condition for an execution order in which the plurality of task groups are executed; setting the first condition based on an input into the first input area: setting the second condition based on an input into the second input area; and generating, based on the first condition and the second condition, a motion program for causing at least one robot 2 to execute the plurality of task groups. The above-described task will be hereinafter referred to as "subsidiary task", and the above-described task group will be hereinafter referred to as "main task". Examples of the main task include, but are not limited to, "moving part A" and "attaching part A (to a workpiece)". Examples of the subsidiary task include, but are not limited to, "removing part A", "placing part A", and "engaging part A (with a workpiece)".

The subsidiary task includes a preset motion path for the robot 2 to execute a predetermined kind of work. The motion path will be hereinafter referred to as "work path". The work path may be taught in advance by an operator. The first condition, under which the subsidiary task is executed, includes: a specifying of the robot 2 to execute the subsidiary task; and a start condition for starting execution of the subsidiary task. The start condition may be determined by a specifying of another subsidiary task that is expected to be completed before start of execution of the subsidiary task.

Programming Assistance Apparatus

Figure 2:
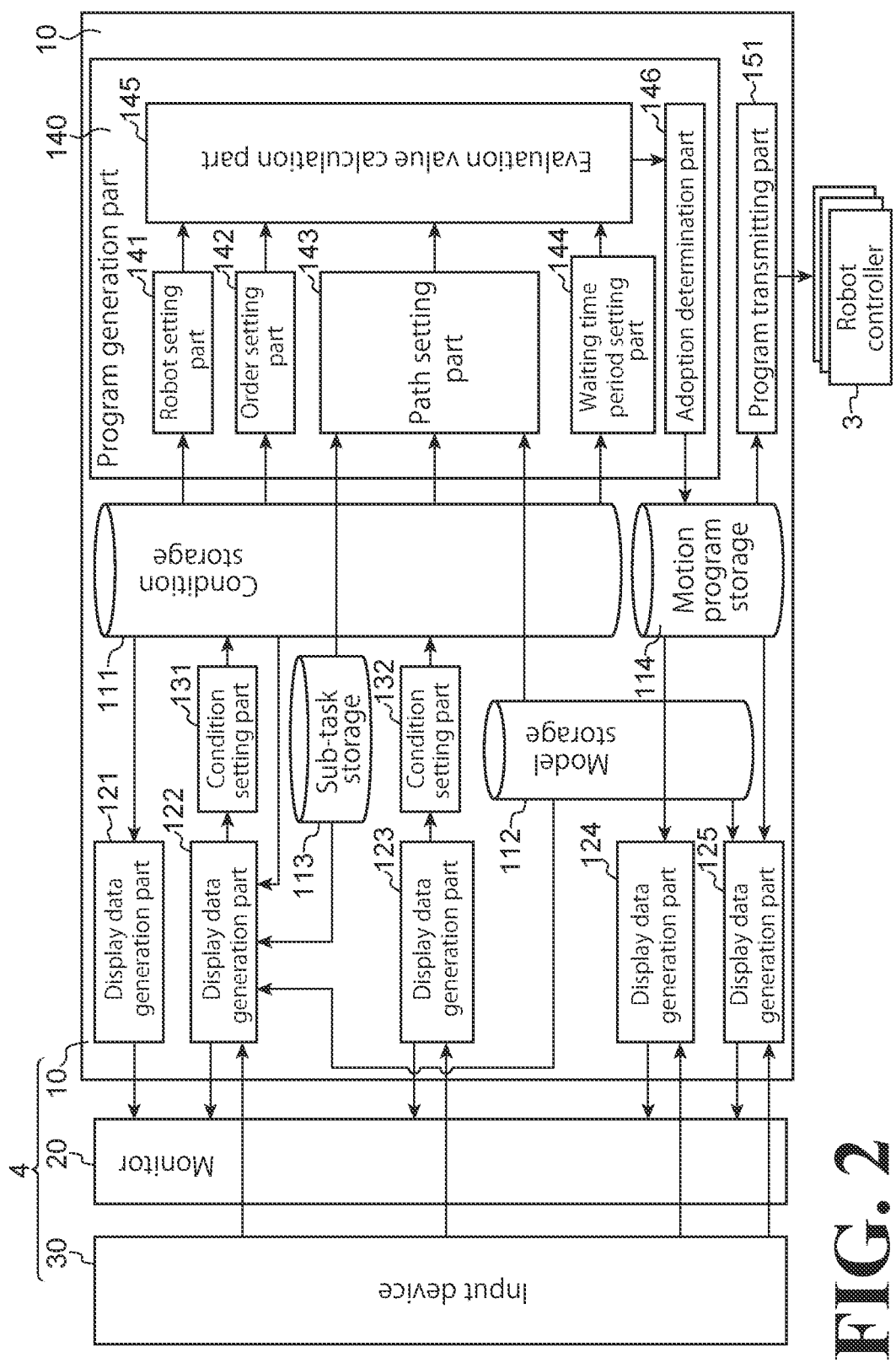
FIG. 2 is a block diagram illustrating a functional configuration of a programming assistance apparatus.

A configuration of the programming assistance apparatus 4 will be described in detail below. As illustrated in FIG. 2, the programming assistance apparatus 4 includes a body 10, a monitor 20, and an input device 30. The body 10 is made up of one computer or a plurality of computers.

The monitor 20 displays information output from the body 10. The monitor 20 may be any monitor that is able to display content graphically. A non-limiting example is a liquid crystal panel. Through the input device 30, information is input into the body 10. The input device 30 may be any input device through which desired information can be input. Non-limiting examples include a key pad and a mouse. The monitor 20 and the input device 30 may be integral to each other to make up a touch panel. Alternatively, all the body 10, the monitor 20, and the input device 30 may be integral to each other to make up a tablet computer, for example.

A functional configuration of the body 10 includes a condition storage 111, a model storage 112, a subsidiary task storage 113, a motion program storage 114, display data generation parts 121, 122, 123, 124, and 125, condition setting parts 131 and 132, a program generation part 140, and a program transmission part 151 (the functional configuration will be hereinafter referred to as "functional modules").

The condition storage 111 stores: configuration information regarding a configuration of the main task; and the first condition and the second condition. The model storage 112 stores a simulation model data. The model data is a three-dimensional surface data of polygonal models of the robot 2 and a surrounding environment of the robot 2. The subsidiary task storage 113 stores work paths for a plurality of subsidiary tasks taught in advance. The motion program storage 114 stores the motion programs.

The display data generation parts 121, 122, 123, 124, and 125 generate data of a screen for programming assistance to be displayed on the monitor 20 (this screen will be hereinafter referred to as "programming assistance screen").

Figure 3:
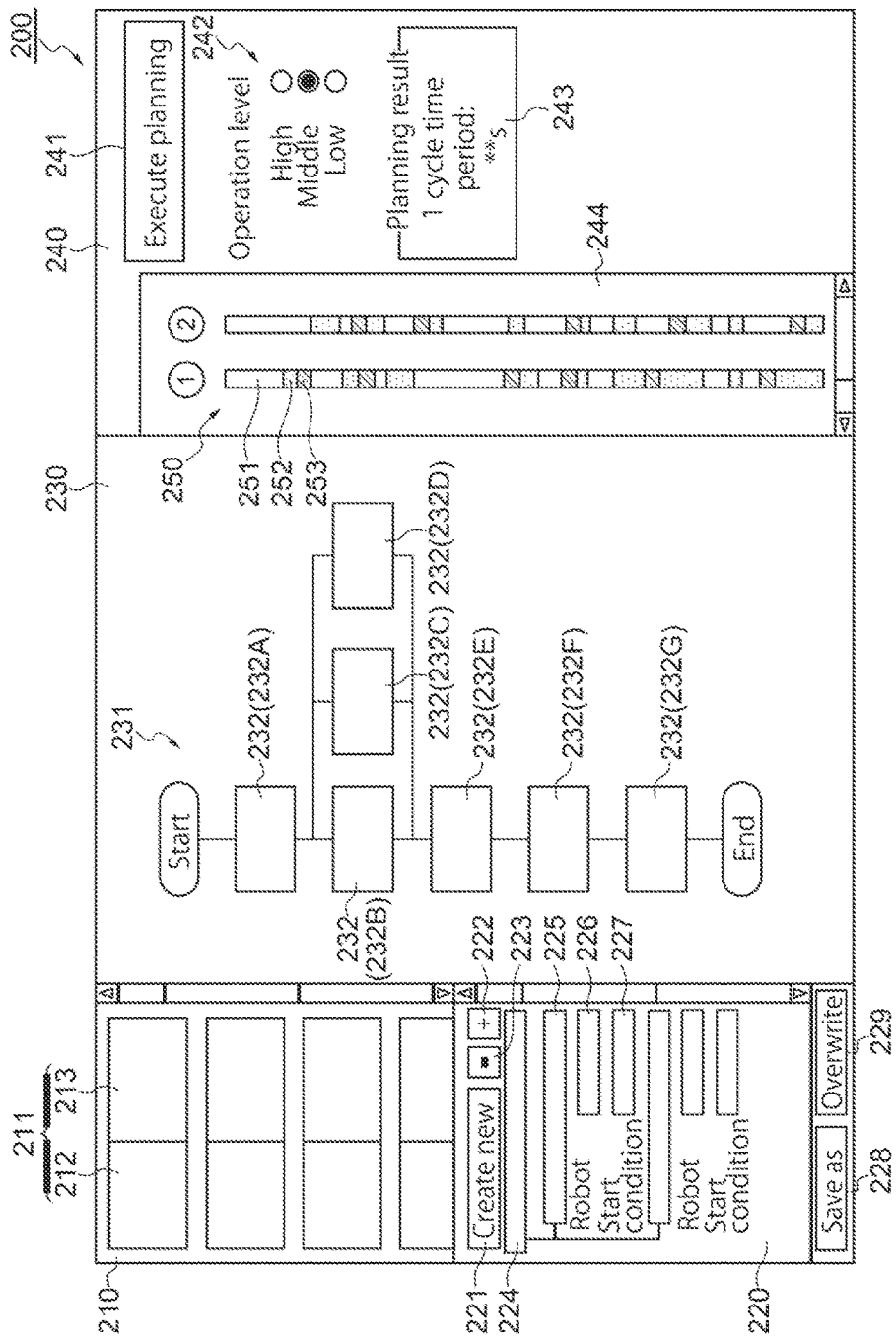
FIG. 3 is a schematic illustrating an example programming assistance screen.

As illustrated in FIG. 3, a programming assistance screen 200 includes a list display area 210, a first input area 220, a second input area 230, and a planning area 240. The list display area 210 displays a list of a plurality of main tasks. For example, the list display area 210 uses icons 211 to display the main tasks. The icons 211 are aligned in a predetermined direction (for example, a height direction of the screen). Each of the icons 211 includes a name display section 212 and a display content display section 213. The name display section 212 displays the name of a main task in letters and characters. The display content display section 213 displays an outline of the configuration of the main task using a mark and/or an illustration.

The first input area 220 is an area in which the first condition is input on a main task basis. For example, the first input area 220 includes a main-task creation button 221, a task addition button 222, a task cancel button 223, a main-task display section 224, subsidiary-task display sections 225, robot input sections 226, start-condition input sections 227, a store-as button 228, and an overwrite-save button 229.

The main-task display section 224 is a text box in which to display identification information (for example, the name of the main task) of a main task. Each of the subsidiary-task display sections 225 is a text box in which to display identification information of a subsidiary task (for example, the name of the subsidiary task). The subsidiary-task display section 225 ramifies from the main-task display section 224 in a branch-like form.

Each of the robot input sections 226 is a text box in which to input, as an example of the first condition, identification information (for example, robot number) of the robot 2 to execute the subsidiary task displayed on the subsidiary-task display section 225. The robot input section 226 ramifies from the subsidiary-task display section 225 in a branch-like form. The identification information of the robot 2 can be input by clicking on (or tapping) the robot input section 226. Each of the start-condition input sections 227 is a text box in which to input, as an example of the first condition, a start condition for start of the subsidiary task displayed on the subsidiary-task display section 225. The start-condition input section 227 ramifies from the subsidiary-task display section 225 in a branch-like form. The start condition for start of the subsidiary task can be input by selecting (for example, clicking on or tapping) the start-condition input section 227.

The main-task creation button 221 is a button to start creating a new main task. By manipulating (for example, clicking on or tapping) the main-task creation button 221, a main task is displayed on the main-task display section 224 with the name of the main task undetermined and with no subsidiary-task display sections 225 included (this state will be hereinafter referred to as "empty state").

The task addition button 222 is a button to add a subsidiary task to the main task. For example, by manipulating (for example, clicking on or tapping) the task addition button 222 with the main-task display section 224 in empty state, one subsidiary-task display section 225 is added to the main-task display section 224. Also, by manipulating the task addition button 222 with any one subsidiary-task display section 225 selected, one subsidiary-task display section 225 is added to a position before or after the selected subsidiary-task display section 225. The task cancel button 223 is a button to remove the subsidiary task from the main task. For example, by manipulating the task addition button 222 with any one subsidiary-task display section 225 selected, the selected subsidiary-task display section 225 is removed.

The store-as button 228 is a button to store, in the condition storage 111, a main task input in the first input area 220 under some another name. The overwrite-save button 229 is a button to overwrite an existing main task using content input in the first input area 220 and to save the overwritten content in the condition storage 111.

The second input area 230 is an area in which the second condition is input. The second input area 230 displays the second condition graphically in the form of flow 231. The flow 231 includes a plurality of icons 232. In the second input area 230, a predetermined direction is regarded as time order direction (hereinafter referred to as "first direction"). In the example illustrated in FIG. 3, the downward direction is regarded as the first direction. In the flow 231, the plurality of icons 232 aligned in the first direction (for example, the icons 232A, 232B, 232E, 232F, and 232G) are executed according to an execution order that is the same as the order in which the plurality of icons 232 are aligned. Also in the flow 231, the plurality of icons 232 aligned in a second direction (horizontal direction in the example illustrated in FIG. 3) orthogonal to the first direction (for example, the icons 232B, 232C, and 232D) are regarded as undetermined as to the execution order in which the plurality of icons 232 are executed.

The planning area 240 is an area in which the motion program is generated. For example, the planning area 240 includes a planning execution button 241, an arithmetic-operation level input section 242, and result display sections 243 and 244. The planning execution button 241 is a button to start generation of the motion program. The arithmetic-operation level input section 242 is an object to input a basis upon which to determine whether to adopt content automatically set to generate the motion program (the basis will be hereinafter referred to as "arithmetic-operation level"). For example, the arithmetic-operation level input section 242 includes a plurality of radio buttons respectively corresponding to a plurality of preset arithmetic-operation levels. The arithmetic-operation level can be set by selecting any one of the plurality of radio buttons.

Each of the result display sections 243 and 244 is a section to display a result obtained by generating the motion program. The result display section 243 displays a period of time necessary for executing one cycle of the motion program. The result display section 244 displays a motion sequence that is based on the motion program. For example, the result display section 244 includes charts 250. Each of the time charts 250 shows a motion sequence on the individual robot 2 basis. The time chart 250 includes a work time period 251 (time period for an execution of the subsidiary task), a movement time period 252 (time period for a movement between subsidiary tasks), and a waiting time period 253. In the example illustrated in FIG. 3, time charts 250 for two robots 2 are illustrated.

Referring again to FIG. 2, the display data generation part 121 (fifth display data generation part) generates a display data to be displayed in the list display area 210 and outputs the display data to the monitor 20. The display data generation part 122 (first display data generation part) generates a display data to be displayed in the first input area 220 and outputs the display data to the monitor 20.

The display data generation part 122 updates the display data to be displayed in the first input area 220 so that a main task selected as a setting target in the list display area 210 is made a setting target in which the first condition is set. For example, when an icon 211 in the list display area 210 has been selected by a click or tapping operation, the display data generation part 122 obtains, from the condition storage 111, information regarding the main task corresponding to the selected icon 211, and updates the display data to be displayed in the first input area 220 so as to display the information. The information regarding the main task includes: identification information regarding the subsidiary tasks included in the main task; and the first condition that has been set.

The display data generation part 123 (second display data generation part) generates a display data to be displayed in the second input area 230 and outputs the display data to the monitor 20. The display data generation part 123 updates the display data to be displayed in the second input area 230 so that a main task selected as an execution target in the list display area 210 is added as a setting target in which the second condition is set. For example, when an icon 211 in the list display area 210 has been drugged to the second input area 230, the display data generation part 123 updates the display data to be displayed in the second input area 230 so that a main task corresponding to the icon 211 is added to the flow 231 and positioned at the drugging end position.

Based on an input into the first input area 220, the condition setting part 131 (first condition setting part) sets: the identification information regarding the subsidiary tasks included in the main task; and the first condition of each of the subsidiary tasks. Then, the condition setting part 131 stores the identification information and the first conditions in the condition storage 111. When the robot 2 to execute the subsidiary task has been specified in the first input area 220, the condition setting part 131 sets the first condition to cause the robot 2 to execute the subsidiary task. When the robot 2 to execute the subsidiary task has not been specified in the first input area 220, the condition setting part 131 sets the first condition to indicate that the robot 2 to execute the task is undetermined. That the robot 2 to execute the subsidiary task is not specified includes such a case that while a plurality of robots 2 capable of executing the subsidiary task have been specified, a particular robot 2 to execute the subsidiary task is not specified yet from among the plurality of robots 2. In this case, the condition setting part 131 sets the first condition to limit the options of robot 2 to execute the subsidiary task to within the plurality of robots 2.

Based on an input into the second input area 230, the condition setting part 132 (second condition setting part) sets the second condition and stores the second condition in the condition storage 111. When an execution of a plurality of main tasks is specified with the execution order determined in the second input area 230, the condition setting part 132 sets the second condition to maintain the execution order. When an execution of a plurality of main tasks is specified with the execution order undetermined in the second input area 230, the condition setting part 132 sets the second condition to indicate that the execution order of the plurality of main tasks is undetermined. For example, when the icons 232 of the plurality of main tasks are aligned in the first direction in the second input area 230, the condition setting part 132 sets the second condition to maintain the execution order as the order in which the icons 232 are aligned. When the icons 232 of the plurality of main tasks are aligned in the second direction in the second input area 230, the condition setting part 132 sets the second condition to indicate that the execution order of the plurality of main tasks is undetermined.

The program generation part 140 generates, based on the first condition and the second condition, a motion program for causing the plurality of robots 2 to execute the plurality of main tasks. For example, the program generation part 140 includes more meticulously segmented functional modules, including an order setting part 142, a robot setting part 141, a path setting part 143, a waiting time period setting part 144, an evaluation value calculation part 145, and an adoption determination part 146.

When the execution order of the plurality of main tasks is undetermined in the second condition, the order setting part 142 sets the execution order of the plurality of main tasks. For example, the order setting part 142 sets the execution order of the plurality of main tasks so that each subsidiary task satisfies the corresponding start condition. The order setting part 142 may set the execution order of the plurality of main tasks whose execution order is undetermined so that at least two main tasks are executed simultaneously. For example, the same number of main tasks as the number of all the robots 2 may be executed simultaneously, insofar as the start conditions are satisfied.

When the subsidiary task is assigned no robot 2 to execute the subsidiary task in the first condition, the robot setting part 141 sets a robot 2 to execute the subsidiary task. When no robot 2 is determined as a robot 2 to execute a plurality of subsidiary tasks and when the execution order set for the plurality of subsidiary tasks is such that the subsidiary tasks are to be executed simultaneously, the robot setting part 141 sets a plurality of robots 2 to respectively execute the plurality of subsidiary tasks. As described above, when the first condition includes limited options of robot 2, the robot setting part 141 sets robots 2 within the range of the limitation.

The path setting part 143 sets, on an individual robot 2 basis, a motion path between execution-target subsidiary tasks (hereinafter referred to as "air cut path"). For example, the path setting part 143 uses a model data stored in the model storage 112 to generate an air cut path that avoids a collision between the robot 2 and its surroundings. More specifically, the path setting part 143 generates an air cut path by repeatedly generating, between the end point of a leading work path and the start point of a following work path, via-points that avoid a collision between the robot 2 and its surroundings and by connecting the via-points together. Details of the method of generating an air cut path is disclosed in JP 4103057B, for example.

The waiting time period setting part 144 sets, on the individual robot 2 basis, a waiting time period to adjust motion timings of the plurality of robots 2. For example, when the motion paths of two robots 2 interfere with each other, the waiting time period setting part 144 sets a waiting time period for any one of the two robots 2 to avoid a collision between the two robots 2.

The evaluation value calculation part 145 calculates, based on a preset evaluation condition, an evaluation value of the settings made by the order setting part 142, the robot setting part 141, the path setting part 143, and the waiting time period setting part 144. Examples of the evaluation value include, but are not limited to, the time period for an execution of a motion program that is based on the settings, and consumption power of the motion program (consumption power of the plurality of robots 2 that operate based on the motion program). It is also possible to calculate an evaluation value by combining the execution time period and the consumption power.

Based on the evaluation value calculated by the evaluation value calculation part 145 and based on the arithmetic-operation level input into the arithmetic-operation level input section 242, the adoption determination part 146 determines whether to adopt the settings made by the order setting part 142, the robot setting part 141, the path setting part 143, and the waiting time period setting part 144. For example, when the evaluation value is at or above a predetermined accepted line, the adoption determination part 146 determines the settings as adoptable. When the evaluation value is below the accepted line, the adoption determination part 146 determines the settings as unadoptable. In this case, the adoption determination part 146 changes the accepted line based on the arithmetic-operation level input into the arithmetic-operation level input section 242.

In another possible embodiment, the order setting part 142, the robot setting part 141, the path setting part 143, the waiting time period setting part 144, and the evaluation value calculation part 145 may repeatedly change the settings and calculate an evaluation value of the settings for a predetermined period of time, and then the adoption determination part 146 may determine, as adoptable, settings from which the most preferable evaluation value has been obtained. In this case, the adoption determination part 146 changes the predetermined period of time based on the arithmetic-operation level input into the arithmetic-operation level input section 242. The adoption determination part 146 stores, in the motion program storage 114, the motion program that is based on the settings determined as adoptable.

Based on the settings determined as adoptable by the adoption determination part 146, the display data generation part 124 (third display data generation part) generates display data to be displayed in the result display sections 243 and 244, and outputs the display data to the monitor 20. For example, the display data generation part 124 generates a period of time necessary for the adoption determination part 146 to execute one cycle of the motion program stored in the motion program storage 114. Also, based on the motion program that the adoption determination part 146 has stored in the motion program storage 114, the display data generation part 124 generates a display data to be displayed on the time chart 250. The time chart 250 shows, on the individual robot 2 basis, the time period for an execution of the subsidiary task, the time period for a movement along the air cut path, and the waiting time period.

Upon input of an instruction for reproduction of a moving image of the robot's motion in any period section of the time chart (for example, by a double-click or double-tapping operation), the display data generation part 125 (fourth display data generation part) generates a display data to be displayed as a moving image a motion of the robot 2 in the period section, and outputs the display data to the monitor 20. For example, based on the motion program stored in the motion program storage 114 and based on the model data stored in the model storage 112, the display data generation part 125 generates a display data to be displayed as a moving image in the select period section. The program transmission part 151 transmits the motion program stored in the motion program storage 114 to the robot controller 3.

Figure 4:
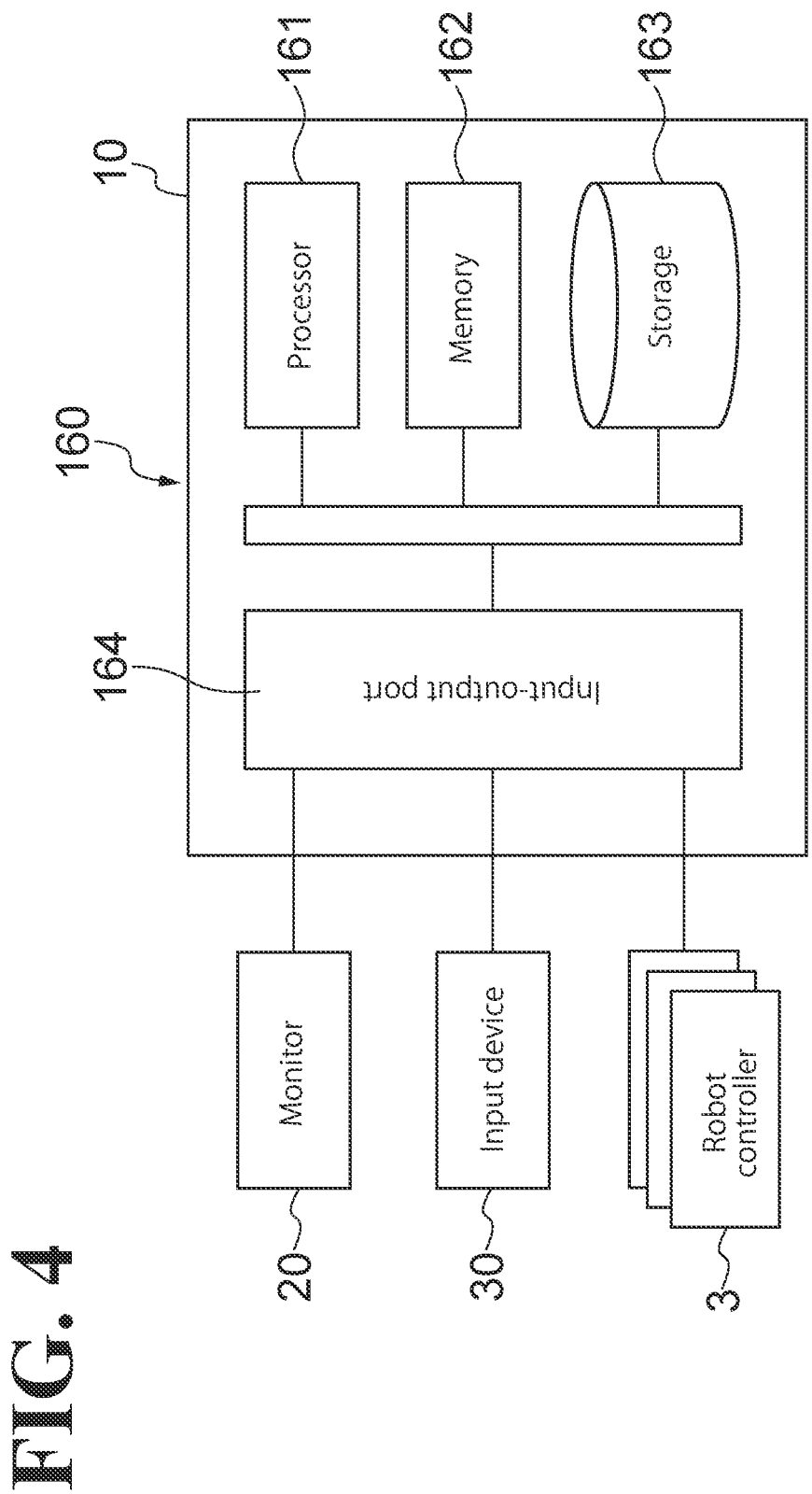
FIG. 4 is a diagram illustrating a hardware configuration of the programming assistance apparatus.

FIG. 4 is a block diagram illustrating a hardware configuration of the body 10. As illustrated in FIG. 4, the body 10 includes circuitry 160. The circuitry 160 includes one processor 161 or a plurality of processors 161, a memory 162, a storage 163, and an input/output port 164. The storage 163 stores programs for implementing the functional modules of the body 10. The storage 163 may be any computer-readable storage. Examples of the storage 163 include, but are not limited to, a hard disc, a nonvolatile semiconductor memory, a magnetic disc, and an optical disc. The memory 162 temporarily stores: programs loaded from the storage 163; and operation results of the processor 161. The processor 161 cooperates with the memory 162 to execute a program, thereby implementing the functional modules. The processor 161 cooperates with the memory 162 to execute a program, thereby implementing the functional modules, examples of the functional modules including, but not limited to, the display data generation parts 121, 122, 123, 124, and 125, the condition setting parts 131 and 132, the program generation part 140, and the program transmission part 151. The input/output port 164, at a command from the processor 161, inputs and outputs electric signals to and from the monitor 20, the input device 30, and the robot controllers 3.

Method for Programming Assistance

A procedure for programming assistance performed by the programming assistance apparatus 4 will be described below as an example of a method for generating a program and a method for programming assistance. The programming assistance procedure includes: generating a first display data to be displayed in the first input area 220 in which to input, for each of a plurality of main tasks, a first condition under which a subsidiary task is executed, the plurality of main tasks including a plurality of subsidiary tasks; generating a second display data to be displayed in the second input area 230 in which to input a second condition for an execution order in which the plurality of main tasks are executed; setting the first condition based on an input into the first input area 220; setting the second condition based on an input into the second input area 230; and generating, based on the first condition and the second condition, a motion program for causing at least one robot 2 to execute the plurality of main tasks. For example, the programming assistance procedure includes: a procedure for displaying content on the programming assistance screen 200; a procedure for setting an editing-target main task; a procedure for obtaining the first condition; a procedure for setting the first condition; a procedure for setting the second condition; a procedure for generating a motion program; and a procedure for reproducing a simulation image. Details of the procedures will be described below.

Procedure for Displaying Content on Programming Assistance Screen

Figure 5:
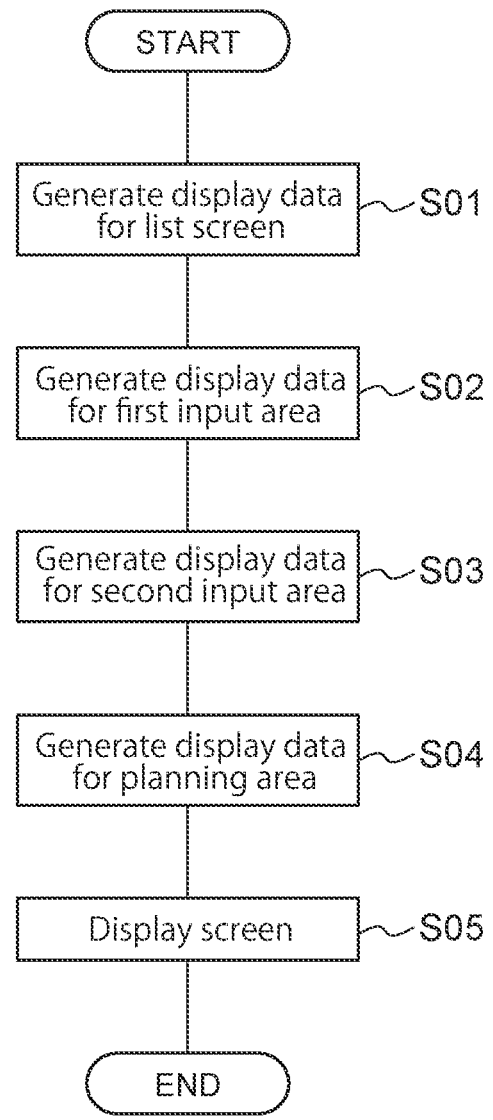
FIG. 5 is a flowchart of a procedure for displaying content on the programming assistance screen.

As illustrated in FIG. 5, the programming assistance apparatus 4 performs step S01. At step S01, the display data generation part 121 generates a display data to be displayed in the list display area 210. For example, the display data generation part 121 generates display data of a plurality of icons 211 respectively corresponding to all the main tasks stored in the condition storage 111. Then, the display data generation part 121 generates a display data to be displayed in the list display area 210 so that the plurality of icons 211 are aligned in a length direction of the list display area 210.

Next, the programming assistance apparatus 4 performs step S02. At step S02, the display data generation part 122 generates a display data to be displayed in the first input area 220. For example, the display data generation part 122 generates the display data to be displayed in the first input area 220 so that the first input area 220 is in its initial state (for example, a state in which an empty main-task display section 224 is displayed).

Next, the programming assistance apparatus 4 performs step S03. At step S03, the display data generation part 123 generates a display data to be displayed in the second input area 230. For example, the display data generation part 123 generates the display data to be displayed in the second input area 230 so that the second input area 230 is in its initial state (a state in which no icons 232 are displayed).

Next, the programming assistance apparatus 4 performs step S04. At step S04, the display data generation part 124 generates a display data to be displayed in the planning area 240. For example, the display data generation part 124 generates the display data to be displayed in the planning area 240 so that the planning area 240 is in its initial state (a state in which the result display sections 243 and 244 show no results obtained by generating a motion program).

Next, the programming assistance apparatus 4 performs step S05. At step S05, the display data generation part 121 outputs the display data of the list display area 210 to the monitor 20; the display data generation part 122 outputs the display data of the first input area 220 to the monitor 20; the display data generation part 123 outputs the display data of the second input area 230 to the monitor 20; and the display data generation part 124 outputs the display data of the planning area 240 to the monitor 20. Thus, the procedure for displaying content on the programming assistance screen 200 is completed. It will be understood by those skilled in the art that the execution order in which steps S01, S02, S03, and S04 are executed may be subject to change as necessary.

Procedure for Setting Editing-Target Main Task

Figure 6:
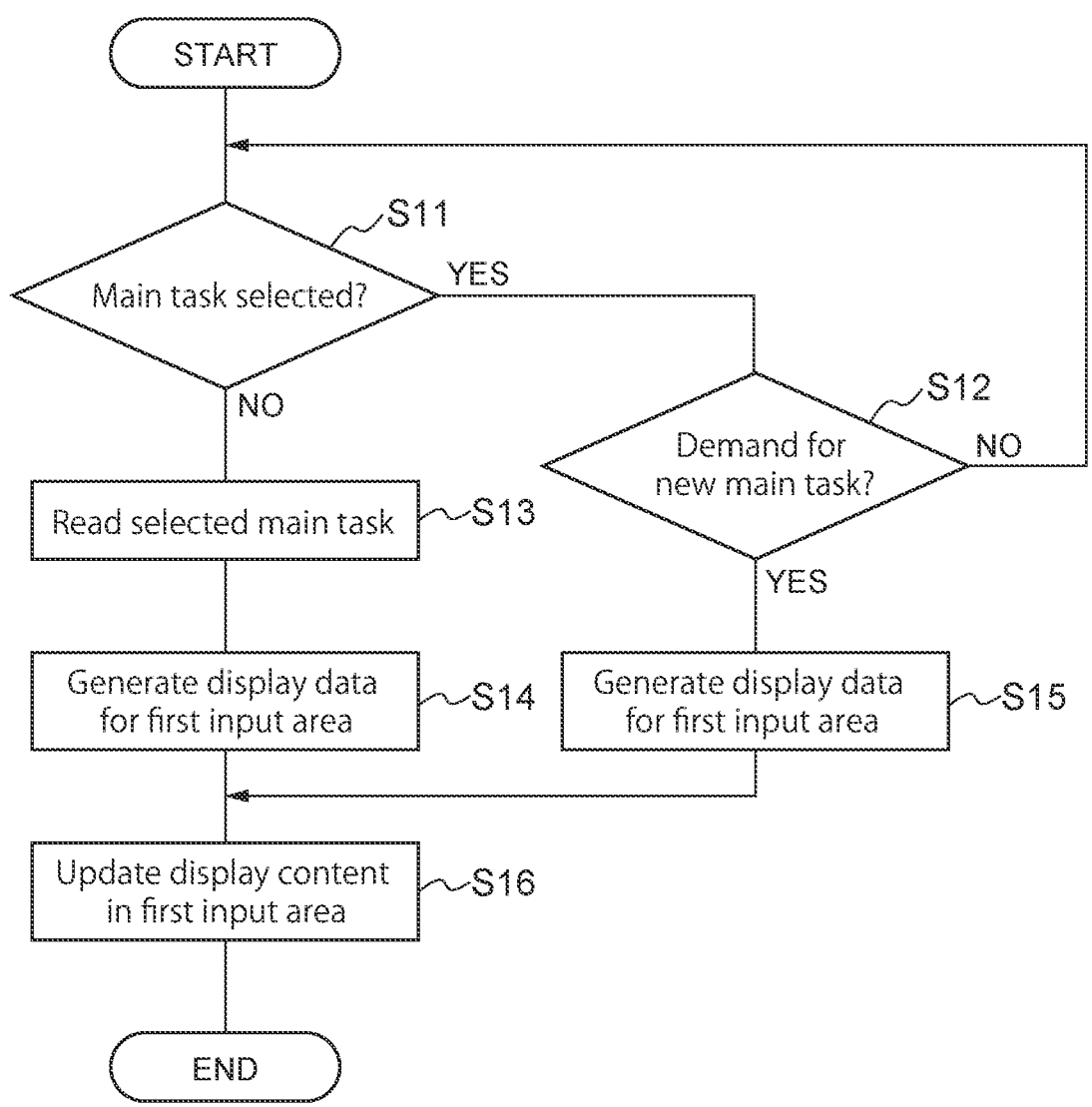
FIG. 6 is a flowchart of a procedure for setting an editing-target main task.

As illustrated in FIG. 6, the programming assistance apparatus 4 performs step S11. At step S11, the display data generation part 122 checks whether any of the main tasks in the list display area 210 has been selected as a setting target (for example, whether an icon 211 has been clicked on or tapped).

At step S11, when the display data generation part 122 has determined that no icons 211 have been selected, the programming assistance apparatus 4 performs step S12. At step S12, the display data generation part 122 determines whether the main-task creation button 221 has been manipulated (for example, by a click or tapping operation). At step S12, when the display data generation part 122 has determined that the main-task creation button 221 has not been manipulated, the programming assistance apparatus 4 returns the processing to step S11. At and after step S11, the programming assistance apparatus 4 waits for an icon 211 to be selected or the main-task creation button 221 to be manipulated.

At step S11, when the display data generation part 122 has determined that a main task has been selected as a setting target, the programming assistance apparatus 4 updates the display data to be displayed in the first input area 220 so that the main task selected in the list display area 210 is made a setting target in which the first condition is set. For example, the programming assistance apparatus 4 performs steps S13 and S14 in this order. At step S13, the display data generation part 122 obtains, from the condition storage 111, information regarding the main task corresponding to the icon 211 selected in the list display area 210. At step S14, the display data generation part 122 generates a display data to be displayed in the first input area 220 so that based on the information obtained at step S13, the first input area 220 shows a main-task display section 224, subsidiary-task display sections 225, robot input sections 226, and start-condition input sections 227.

At step S12, when the display data generation part 122 has determined that the main-task creation button 221 has been manipulated, the programming assistance apparatus 4 performs step S15. At step S15, the display data generation part 122 generates a display data to be displayed in the first input area 220 so that the first input area 220 includes an empty main-task display section 224.

After performing step S14 or S15, the programming assistance apparatus 4 performs step S16. At step S16, the display data generation part 122 outputs to the monitor 20 the display data that is to be displayed in the first input area 220 and that has been generated at step S14 or step S15. Thus, the procedure for setting an editing-target main task is completed. The programming assistance apparatus 4 repeats the above-described procedure until the programming assistance screen 200 is closed.

Procedure for Obtaining First Condition

Figure 7:
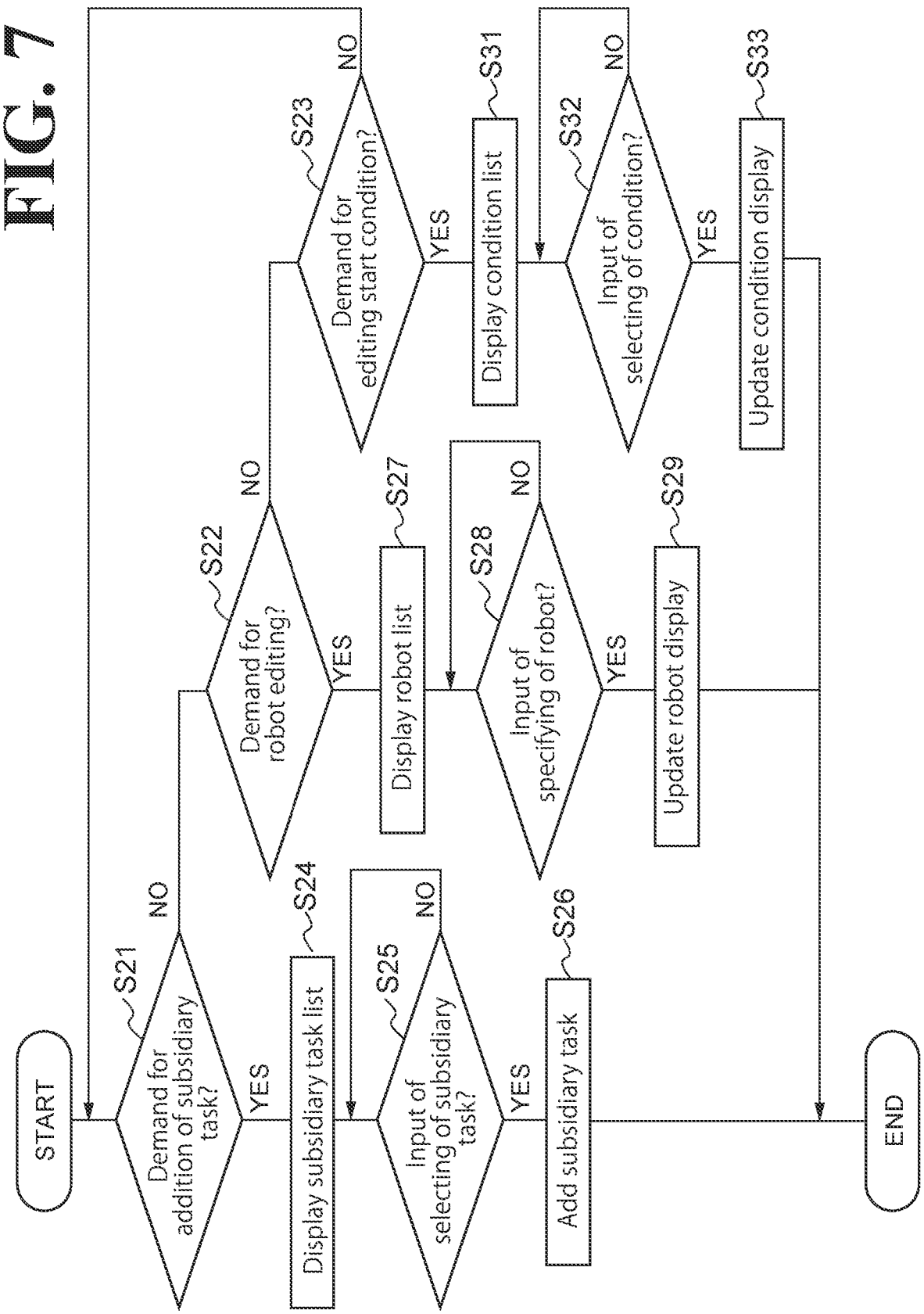
FIG. 7 is a flowchart of a procedure for obtaining a first condition.

As illustrated in FIG. 7, the programming assistance apparatus 4 performs step S21. At step S21, the display data generation part 122 checks whether the task addition button 222 has been manipulated (for example, by a click or tapping operation). At step S21, when the display data generation part 122 has determined that the task addition button 222 has not been manipulated, the programming assistance apparatus 4 performs step S22. At step S22, the display data generation part 122 checks whether the robot input section 226 of any of the subsidiary-task display sections 225 has been selected (for example, by a click or tapping operation). At step S22, when the display data generation part 122 has determined that no robot input sections 226 have been selected, the programming assistance apparatus 4 performs step S23. At step S23, the display data generation part 122 checks whether the start-condition input section 227 of any of the subsidiary-task display sections 225 has been selected (for example, by a click or tapping operation). At step S23, when the display data generation part 122 has determined that no start-condition input sections 227 have been selected, the programming assistance apparatus 4 returns the processing to step S21. At and after step S21, the programming assistance apparatus 4 waits for the task addition button 222 to be manipulated; waits for a robot input section 226 to be selected; or waits for a start-condition input section 227 to be selected.

At step S21, when the display data generation part 122 has determined that the task addition button 222 has been manipulated, the programming assistance apparatus 4 performs steps S24, S25, and S26 in this order. At step S24, the display data generation part 122 generates, by referring to the subsidiary task storage 113, a list of subsidiary tasks that can be added to the main task displayed in the main-task display section 224. Then, the display data generation part 122 updates the display data to be displayed in the first input area 220 so that the first input area 220 shows the list. Then, the display data generation part 122 outputs the display data to the monitor 20. At step S25, the display data generation part 122 waits for any of the subsidiary tasks in the list to be selected. At step S26, the display data generation part 122 updates the display data to be displayed in the first input area 220 so that a subsidiary-task display section 225 indicating the selected subsidiary task (hereinafter referred to as "new subsidiary-task display section 225") is added to the first input area 220. Then, the display data generation part 122 outputs the display data to the monitor 20.

When the main-task display section 224 is in empty state, the display data generation part 122 updates the display data to be displayed in the first input area 220 so that the new subsidiary-task display section 225 depends on the main-task display section 224. When there are already a plurality of subsidiary-task display sections 225 in the main-task display section 224 with any one of the subsidiary-task display sections 225 in selected state, the display data generation part 122 updates the display data to be displayed in the first input area 220 so that the new subsidiary-task display section 225 is added at a position before the selected subsidiary-task display section 225.

At step S22, when the display data generation part 122 has determined that the robot input section 226 has been selected, the programming assistance apparatus 4 performs steps S27, S28, and S29 in this order. At step S27, the display data generation part 122 generates, by referring to the model storage 112, a list of robots 2 capable of executing the corresponding subsidiary task (the subsidiary task displayed on the subsidiary-task display section 225 on which the robot input section 226 depends). Then, the display data generation part 122 updates the display data to be displayed in the first input area 220 so that the first input area 220 shows the list. Then, the display data generation part 122 outputs the display data to the monitor 20. At step S28, the display data generation part 122 waits for any of the robots 2 in the list to be selected. At step S29, the display data generation part 122 updates the display data to be displayed in the first input area 220 so that the robot input section 226 shows the identification information of the selected robot 2. Then, the display data generation part 122 outputs the display data to the monitor 20.

At step S23, when the display data generation part 122 has determined that the start-condition input section 227 has been selected, the programming assistance apparatus 4 performs steps S31, S32, and S33 in this order. At step S31, the display data generation part 122 generates a display data of a list of start conditions for the subsidiary task and outputs the display data to the monitor 20. For example, the display data generation part 122 generates, by referring to the subsidiary task storage 113, a display data of a list of subsidiary tasks that can be specified to be completed before the start of the corresponding subsidiary task (the subsidiary task displayed on the subsidiary-task display section 225 on which the start-condition input section 227 depends). Such subsidiary tasks will be hereinafter referred to as "start-condition subsidiary tasks" or "start-condition subsidiary task". At step S32, the display data generation part 122 waits for any of the start conditions in the list to be selected. At step S33, the display data generation part 122 updates the display data to be displayed in the first input area 220 so that the start-condition input section 227 shows the selected start condition. Then, the display data generation part 122 outputs the display data to the monitor 20. Thus, the procedure for obtaining the first condition is completed. The programming assistance apparatus 4 repeats the above-described procedure until the programming assistance screen 200 is closed.

Procedure for Setting First Condition

Figure 8:
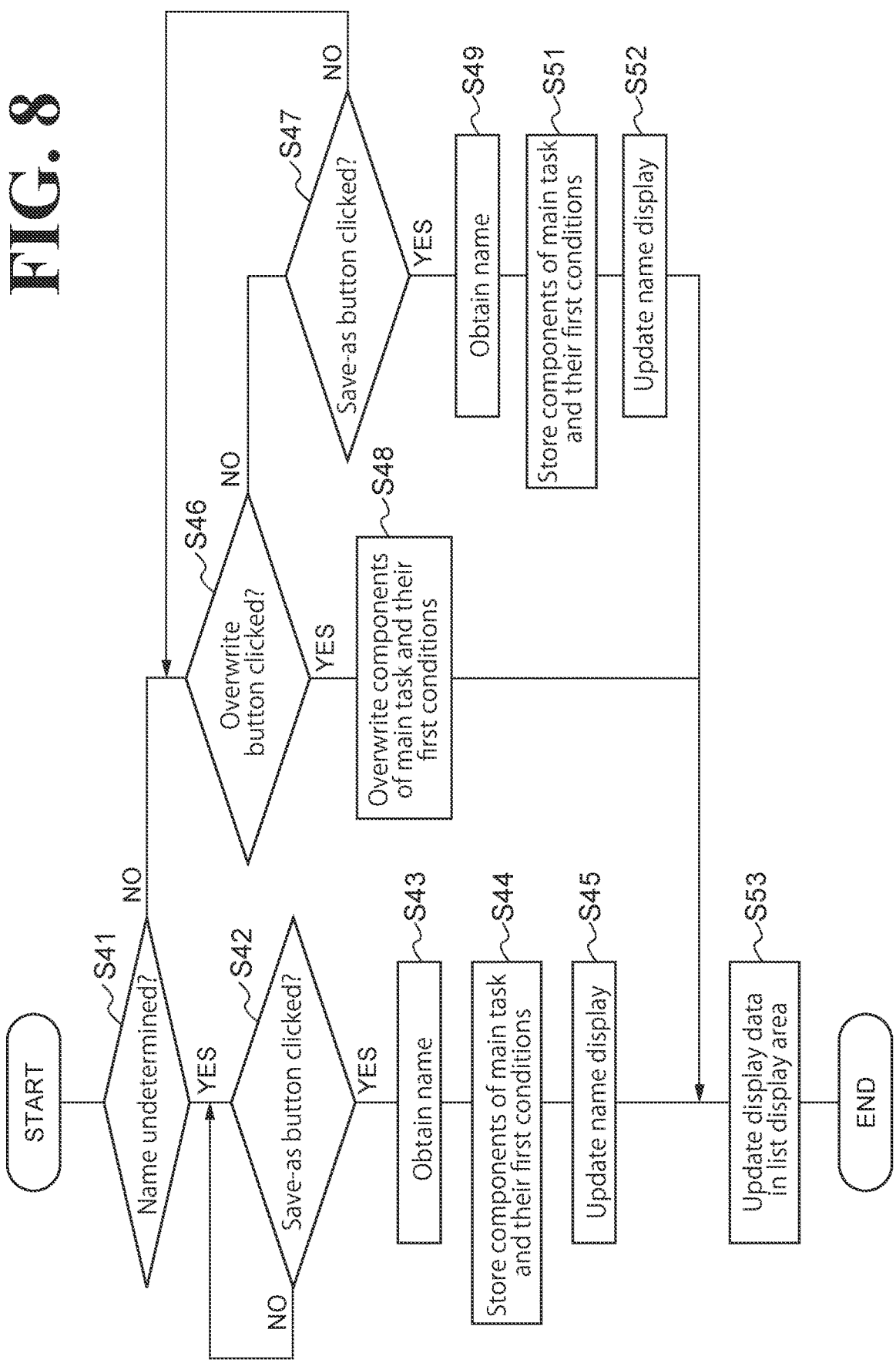
FIG. 8 is a flowchart of a procedure for setting the first condition.

As illustrated in FIG. 8, the programming assistance apparatus 4 performs step S41. At step S41, the condition setting part 131 checks whether the name of the setting-target main task is undetermined.

At step S41, when the condition setting part 131 has determined that the name of the setting-target main task is undetermined, the programming assistance apparatus 4 performs steps S42, S43, S44, and S45 in this order. At step S42, the condition setting part 131 waits for the store-as button 228 to be manipulated (for example, by a click or tapping operation). At step S43, the display data generation part 122 obtains the name of the main task input in a dialog box, for example. At step S44, based on the content displayed in the first input area 220, the condition setting part 131 combines the name of the main task, the subsidiary tasks constituting the main task (the subsidiary tasks included in the main task), and the first conditions of the subsidiary tasks. Then, the condition setting part 131 stores the combination in the condition storage 111. At step S45, the display data generation part 122 updates the display data to be displayed in the first input area 220 so that the main-task display section 224 shows the name obtained at step S43. Then, the display data generation part 122 outputs the display data to the monitor 20.

At step S41, when the condition setting part 131 has determined that the name of the setting-target main task is set, the programming assistance apparatus 4 performs step S46. At step S46, the condition setting part 131 checks whether the overwrite-save button 229 has been manipulated (for example, by a click or tapping operation). At step S46, when the condition setting part 131 has determined that the overwrite-save button 229 has not been manipulated, the programming assistance apparatus 4 performs step S47. At step S47, the condition setting part 131 checks whether the store-as button 228 has been manipulated. At step S47, when the condition setting part 131 has determined that the store-as button 228 has not been manipulated, the programming assistance apparatus 4 returns the processing to step S46. At and after step S46, the programming assistance apparatus 4 waits for the overwrite-save button 229 to be manipulated or the store-as button 228 to be manipulated.

At step S46, when the condition setting part 131 has determined that the overwrite-save button 229 has been manipulated, the programming assistance apparatus 4 performs step S48. At step S48, based on the content displayed in the first input area 220, the condition setting part 131 overwrites, in the condition storage 111, the subsidiary tasks constituting the setting-target main task and the first conditions of the subsidiary tasks.

At step S47, when the condition setting part 131 has determined that the store-as button 228 has been manipulated, the programming assistance apparatus 4 performs steps S49, S51, and S52 in this order. At step S49, the display data generation part 122 obtains the name of the main task input in a dialog box, for example. At step S51, based on the content displayed in the first input area 220, the condition setting part 131 combines a new name of the main task, the subsidiary tasks constituting the main task (the subsidiary tasks included in the main task), and the first conditions of the subsidiary tasks. Then, the condition setting part 131 stores the combination in the condition storage 111. At step S52, the display data generation part 122 updates the display data to be displayed in the first input area 220 so that the main-task display section 224 shows the name obtained at step S49. Then, the display data generation part 122 outputs the display data to the monitor 20.

After performing steps S45, S48, and S52, the programming assistance apparatus 4 performs step S53. At step S53, based on the update of the content stored in the condition storage 111, the display data generation part 121 updates the display data of the list display area 210. Then, the display data generation part 121 outputs the display data to the monitor 20. Thus, the procedure for setting the first condition is completed. The programming assistance apparatus 4 repeats the above-described procedure until the programming assistance screen 200 is closed.

Procedure for Setting Second Condition

Figure 9:
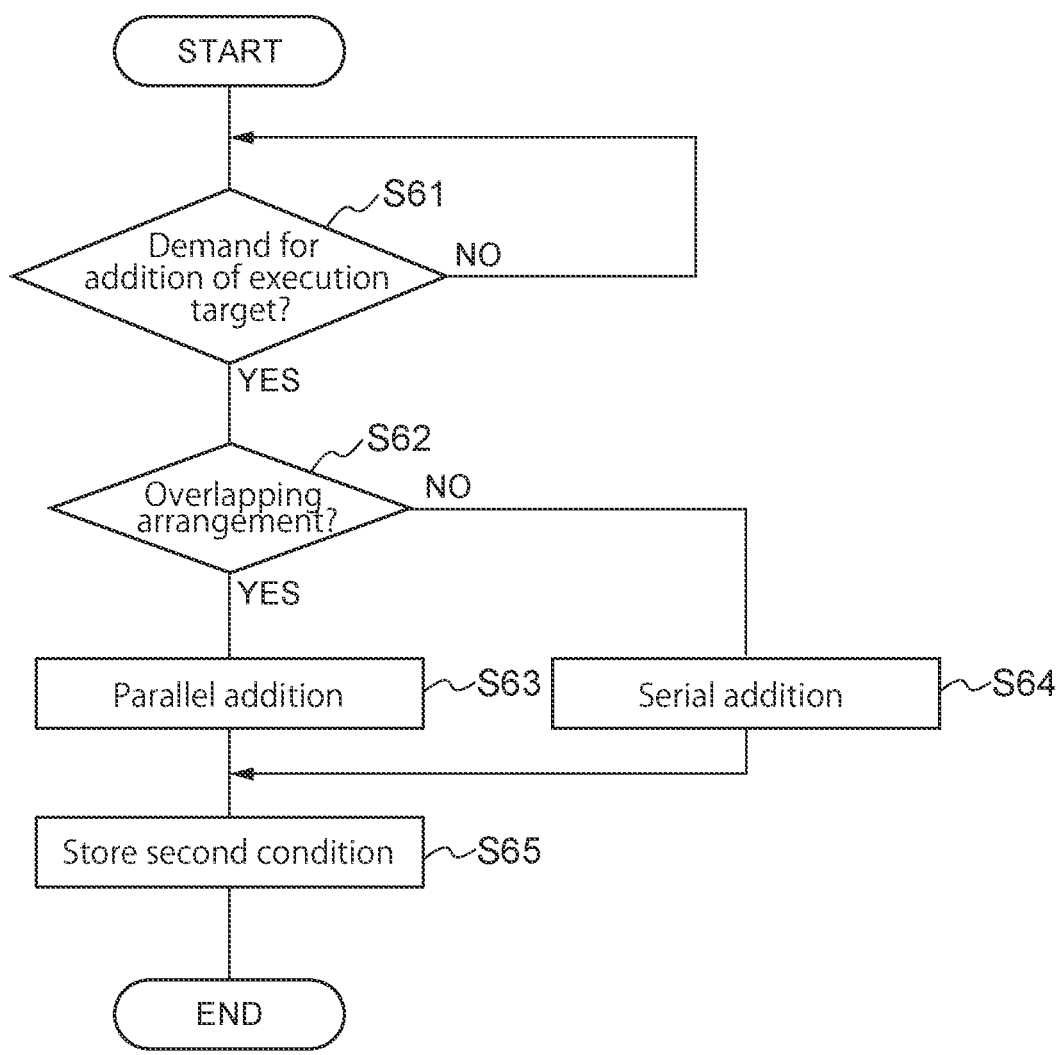
FIG. 9 is a flowchart of a procedure for setting a second condition.

As illustrated in FIG. 9, the programming assistance apparatus 4 performs step S61. At step S61, the display data generation part 123 waits for an execution-target main task to be added in the second input area 230. For example, the display data generation part 123 waits for any of the icons 211 in the list display area 210 to be drugged to the second input area 230. The main task added in the second input area 230 will be hereinafter referred to as "added main task".

Next, the programming assistance apparatus 4 performs step S62. At step S62, the display data generation part 123 checks whether an icon 232 of an existing main task is located at a position overlapping the adding position of the added main task (for example, the drugging end position of the icon 211 of the added main task). As used herein, the expression "overlapping" refers to such a situation that positions overlap each other in the first direction. An existing main task located at a position overlapping the adding position of the added main task will be hereinafter referred to as "overlapping main task". An existing main task located at a position that does not overlap the adding position of the added main task will be hereinafter referred to as "non-overlapping main task".

At step S62, when the display data generation part 123 has determined that there is an overlapping main task, the programming assistance apparatus 4 performs step S63. At step S63, the display data generation part 123 updates the display data to be displayed in the second input area 230 so that the icon 232 of the added main task is added in the second input area 230 at a position parallel to the icon 232 of the overlapping main task (that is, the icons 232 are aligned in the second direction). Then, the display data generation part 123 outputs the display data to the monitor 20.

At step S62, when the display data generation part 123 has determined that there is no overlapping main task, the programming assistance apparatus 4 performs step S64. At step S63, the display data generation part 123 updates the display data to be displayed in the second input area 230 so that the icon 232 of the added main task is added in the second input area 230 at a position that is not parallel to the icon 232 of the existing main task. Then, the display data generation part 123 outputs the display data to the monitor 20. When there is an icon 232 of a non-overlapping main task before (or next to) the adding position, the display data generation part 123 adds the display data of the icon 232 of the added main task in the second input area 230 so that the icon 232 of the added main task is located next to (or before) the icon 232 of the non-overlapping main task. When there is an icon 232 of a non-overlapping main task before the adding position and there is an icon 232 of another non-overlapping main task next to the adding position, the display data generation part 123 updates the display data to be displayed in the second input area 230 so that the icon 232 of the added main task is located between the icons 232 of the two non-overlapping main tasks.

Next to steps S63 and S64, the programming assistance apparatus 4 performs step S65. At step S65, the display data generation part 123 sets the second condition based on an input into the second input area 230 and stores the second condition in the condition storage 111. For example, when the icons 232 of the plurality of main tasks are aligned in the first direction in the second input area 230, the display data generation part 123 sets the second condition to maintain the execution order as the order in which the icons 232 are aligned. When the icons 232 of the plurality of main tasks are aligned in the second direction in the second input area 230, the display data generation part 123 sets the second condition to indicate that the execution order of the plurality of main tasks is undetermined. Thus, the procedure for setting the second condition is completed. The programming assistance apparatus 4 repeats the above-described procedure until the programming assistance screen 200 is closed.

Procedure for Generating Motion Program

Figure 10:
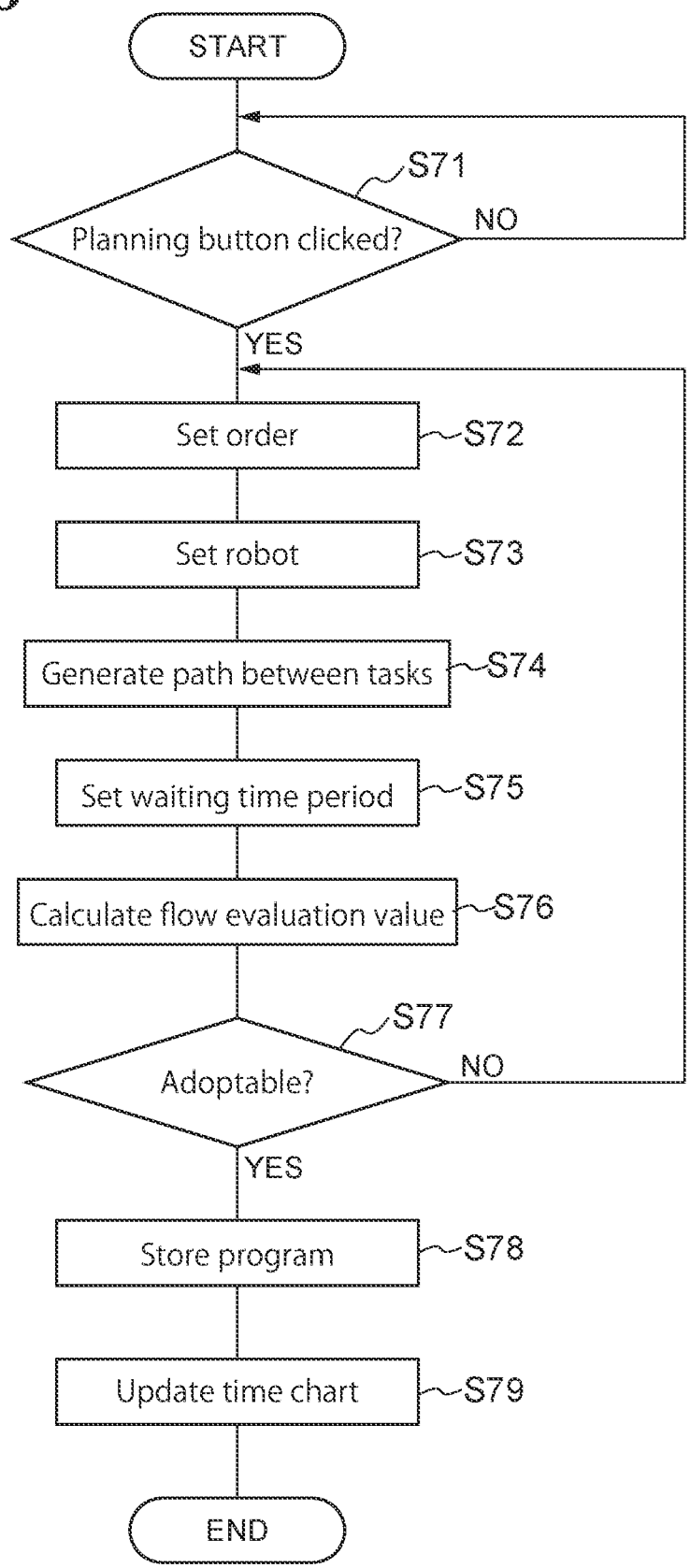
FIG. 10 is a flowchart of a procedure for generating a motion program.

As illustrated in FIG. 10, the programming assistance apparatus 4 performs step S71. At step S71, the program generation part 140 waits for the planning execution button 241 to be manipulated (for example, by a click or tapping operation).

Next, the programming assistance apparatus 4 performs steps S72 and S73 in this order. At step S72, the order setting part 142 sets the execution order of the plurality of main 645 tasks whose execution order is undetermined in the second condition. For example, the order setting part 142 sets the execution order of the plurality of main tasks so that each subsidiary task satisfies the corresponding start condition. The order setting part 142 may set the execution order of the plurality of main tasks whose execution order is undetermined so that at least two main tasks of the plurality of main tasks are executed simultaneously. At step S73, the robot setting part 141 sets a robot 2 to the subsidiary task that is assigned no robot 2 to execute the subsidiary task in the first condition. When no robot 2 is determined as a robot 2 to execute a plurality of subsidiary tasks and when the execution order set for the plurality of subsidiary tasks is such that the subsidiary tasks are to be executed simultaneously, the robot setting part 141 sets a plurality of robots 2 to respectively execute the plurality of subsidiary tasks.

Next, the programming assistance apparatus 4 performs steps S74, S75, and S76 in this order. At step S74, the path setting part 143 sets, on the individual robot 2 basis, an air cut path between execution-target subsidiary tasks. At step S75, the waiting time period setting part 144 sets, on the individual robot 2 basis, a waiting time period to adjust motion timings of the plurality of robots 2. At step S76, the evaluation value calculation part 145 calculates, based on a preset evaluation condition, an evaluation value of the settings made by the order setting part 142, the robot setting part 141, the path setting part 143, and the waiting time period setting part 144.

Next, the programming assistance apparatus 4 performs step S77. At step S77, based on the evaluation value calculated by the evaluation value calculation part 145 and based on the arithmetic-operation level input into the arithmetic-operation level input section 242, the adoption determination part 146 determines whether to adopt the settings made by the order setting part 142, the robot setting part 141, the path setting part 143, and the waiting time period setting part 144. For example, when the evaluation value is at or above a predetermined accepted line, the adoption determination part 146 determines the settings as adoptable. When the evaluation value is below the accepted line, the adoption determination part 146 determines the settings as unadoptable. The adoption determination part 146 changes the accepted line based on the arithmetic-operation level input into the arithmetic-operation level input section 242.

At step S77, when the adoption determination part 146 has determined as unadoptable the settings made by the order setting part 142, the robot setting part 141, the path setting part 143, and the waiting time period setting part 144, the programming assistance apparatus 4 returns the processing to step S72. At and after step S72, the setting of the execution order, the setting of the robot to execute a subsidiary task, the setting of an air cut path, and the setting of a waiting time period are repeated until the settings are determined as adoptable.

At step S77, when the adoption determination part 146 has determined as adoptable the settings made by the order setting part 142, the robot setting part 141, the path setting part 143, and the waiting time period setting part 144, the programming assistance apparatus 4 performs steps S78 and S79 in this order. At step S78, the adoption determination part 146 stores (saves), in the motion program storage 114, the motion program that is based on the settings determined as adoptable. At step S79, based on the settings determined as adoptable by the adoption determination part 146, the display data generation part 124 generates display data to be displayed in the result display sections 243 and 244 and outputs the display data to the monitor 20. For example, the display data generation part 124 generates a period of time necessary for the adoption determination part 146 to execute one cycle of the motion program stored in the motion program storage 114. Also, based on the motion program that the adoption determination part 146 has stored in the motion program storage 114, the display data generation part 124 generates a display data to be displayed on the time chart 250. The time chart 250 shows, on the individual robot 2 basis, the time period for an execution of the subsidiary task, the time period for a movement along the air cut path, and the waiting time period. Thus, the procedure for generating the motion program is completed. The programming assistance apparatus 4 repeats the above-described procedure until the programming assistance screen 200 is closed.

At step S72, the programming assistance apparatus 4 may repeat S73, S74, S75, and S76 for a predetermined period of time, and then determine, as adoptable, settings from which the most preferable evaluation value has been obtained. In this case, the adoption determination part 146 changes the predetermined period of time based on the arithmetic-operation level input into the arithmetic-operation level input section 242.

Procedure for Reproducing Simulation Image

Figure 11:
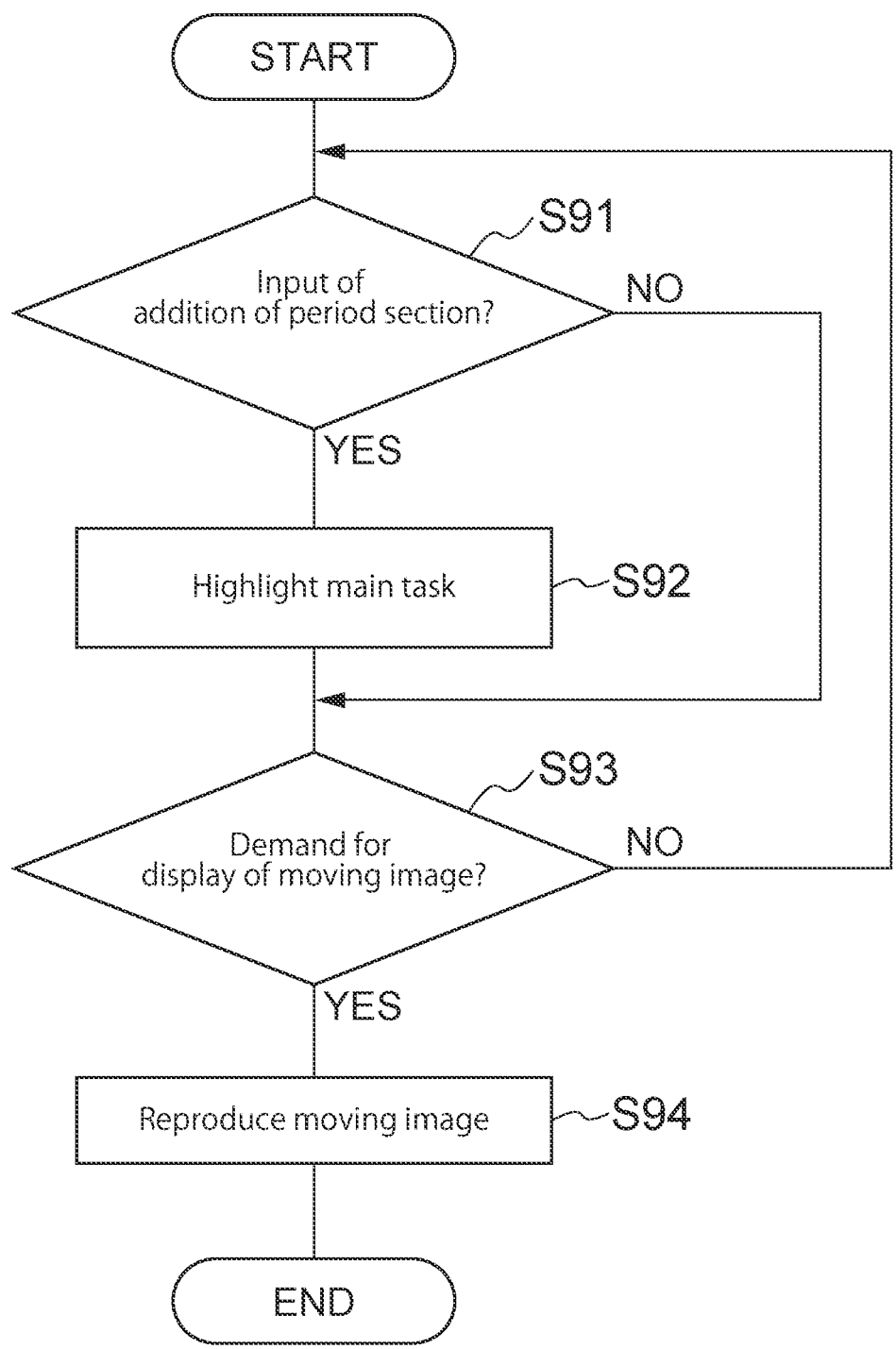
FIG. 11 is a flowchart of a procedure for reproducing a simulation image.

As illustrated in FIG. 11, the programming assistance apparatus 4 performs steps S91 and S92 in this order. At step S91, the display data generation part 123 checks whether any of the period sections of the time chart 250 has been selected anew (for example, by a click or tapping operation).

At step S91, when the display data generation part 123 has determined that a period section has been selected anew, the programming assistance apparatus 4 performs step S92. At step S92, the display data generation part 123 updates the display data to be displayed in the second input area 230 so that the icon 232 of the main task corresponding to the selected period section of the time chart 250 is highlighted.

Then, the display data generation part 123 outputs the display data to the monitor 20.

Next, the programming assistance apparatus 4 performs step S93. At step S91, when the display data generation part 123 has determined that no period section has been selected anew, the programming assistance apparatus 4 performs step S93 without executing step S92. At step S93, the display data generation part 125 checks whether there has been an input of an instruction for reproduction of a moving image of the robot's motion in the selected period section (for example, by a double-click or double-tapping operation).

At step S93, when the display data generation part 125 has determined that no instruction for reproduction of a moving image has been input, the programming assistance apparatus 4 returns the processing to step S91. At and after step S91, the programming assistance apparatus 4 waits for an input of an instruction for reproduction of a moving image of the robot's motion while changing the content displayed in the second input area 230 based on which period section is being selected.

At step S93, when the display data generation part 125 has determined that there has been made an input of an instruction for reproduction of a moving image, the programming assistance apparatus 4 performs step S94. At step S94, the display data generation part 125 generates a display data of a moving image of the robot's motion in the selected period section. Then, the display data generation part 125 outputs the display data to the monitor 20. Thus, the procedure for reproducing a simulation image is completed. The programming assistance apparatus 4 repeats the above-described procedure until the programming assistance screen 200 is closed.

Advantageous Effects of the Embodiment

The programming assistance apparatus 4 includes the display data generation part 122, the display data generation part 123, the condition setting part 131, the condition setting part 132, and the program generation part 140. The display data generation part 122 generates a first display data to be displayed in the first input area 220. The first input area 220 is an area in which to input, for each of a plurality of task groups (main tasks), a first condition under which the robot 2 executes a task, the plurality of task groups include a plurality of the tasks (subsidiary tasks). The display data generation part 123 generates a second display data to be displayed in the second input area 230. The second input area 230 is an area in which to input a second condition for an execution order in which the plurality of task groups are executed. The condition setting part 131 sets the first condition based on an input into the first input area 220. The condition setting part 132 sets the second condition based on an input into the second input area 230. The program generation part 140 generates, based on the first condition and the second condition, a motion program for causing at least one robot 2 to execute the plurality of task groups.

With this configuration, the programming assistance apparatus 4 sorts conditions into the first condition, which is associated with an execution of an individual task, and the second condition, which is associated with the execution order. This ensures that desired conditions can be input. Also, both the first condition and the second condition can be input on a task group basis, combining a plurality of tasks together. This reduces the burden of inputting desired conditions. Upon input of the first condition and the second condition, a motion program is automatically generated based on the first condition and the second condition. Thus, the programming assistance apparatus 4 is effective in reducing the burden of motion programming for the robot 2.

When the robot 2 to execute the task is specified in the first input area 220, the condition setting part 131 may set the first condition to cause the task to execute the robot 2. When the robot 2 to execute the task is not specified in the first input area 220, the condition setting part 131 may set the first condition to indicate that the robot 2 to execute the task is undetermined. The program generation part 140 may include the robot setting part 141. When the robot 2 to execute the task is undetermined in the first condition, the robot setting part 141 may set the robot 2 to execute the task. In this case, an input for specifying the robot 2 to execute the task is used as opposed to an input for allowing the program generation part 140 to select the robot 2 to execute the task. This reduces the burden of setting conditions and shortens time for program generation at the same time.

When an execution of the plurality of task groups is specified with the execution order determined in the second input area 230, the condition setting part 132 may set the second condition to maintain the execution order. When the execution of the plurality of task groups is specified with the execution order undetermined in the second input area 230, the condition setting part 132 may set the second condition to indicate that the execution order of the plurality of task groups is undetermined. The program generation part 140 may further include the order setting part 142. When the execution order of the plurality of task groups is undetermined in the second condition, the order setting part 142 may set the execution order of the plurality of task groups. In this case, an input for specifying the execution order in advance is used as opposed to an input for allowing the program generation part 140 to set the execution order. This reduces the burden of setting conditions and shortens time for program generation at the same time.

When the execution order of the plurality of task groups is undetermined, the order setting part 142 may set the execution order of the plurality of task groups so that at least two task groups of the plurality of task groups are executed simultaneously. When the execution order is set so that the at least two task groups are executed simultaneously while the robot to execute the at least two robot tasks are undetermined, the robot setting part 141 may set a plurality of robots 2 to execute the at least two task groups. This ensures that a motion program contributing shortening of tact time is generated. This, as a result, reduces the burden of adjusting the generated motion program in an attempt to shorten the tact time.

When the icons 232 of a plurality of tasks groups are aligned in the first direction in the second input area 230, the condition setting part 132 may set the second condition to maintain the execution order as the order in which the icons 232 of the plurality of task groups are aligned. When the icons 232 of the plurality of tasks groups are aligned in the second direction crossing the first direction in the second input area 230, the condition setting part 132 may set second condition to indicate that the execution order of the plurality of task groups is undetermined. This results in an interface that can be used so intuitively that an input for specifying the execution order in advance is easily distinguished from an input for allowing the program generation part 140 to setting the execution order.

The program generation part 140 may further include the path setting part 143, the waiting time period setting part 144, and the adoption determination part 146. The path setting part 143 sets a motion path between execution-target tasks on the individual robot 2 basis. The waiting time period setting part 144 sets, on the individual robot 2 basis, a waiting time period to adjust motion timings of the plurality of robots 2. The adoption determination part 146 determines, based on a preset evaluation condition, whether to adopt the settings made by the robot setting part 141, the order setting part 142, the path setting part 143, and the waiting time period setting part 144. This configuration ensures that the generation of a motion path and the setting of a waiting time period are automatically performed, in addition to the setting of the robot 2 to execute the task and the setting of the task execution order. The above configuration also ensures that based on a preset evaluation condition, a determination is made as to whether to adopt the result of setting of the robot 2 to execute a task, the result of setting of the task execution order, the result of generation of a motion path, and the result of setting of a waiting time period. As a result, the burden of adjusting the generated motion program is further reduced.

The programming assistance apparatus 4 may further include the display data generation part 124. Based on the settings determined as adoptable by the adoption determination part 146, the display data generation part 124 generates a display data to be displayed on a time chart that shows, on the individual robot 2 basis, a time period for an execution of a task, a time period for a movement along the motion path, and the waiting time period. This configuration ensures that the resulting interface makes it easy to evaluate the generated motion program. As a result, the burden of verifying the generated motion program is reduced.

The programming assistance apparatus 4 may further include the display data generation part 125. The display data generation part 125 generates a display data to be displayed as a moving image of a motion of the robot 2 in a period selected on the time chart. This configuration ensures that the resulting interface makes it easier to evaluate the generated motion program. As a result, the burden of verifying the generated motion program is further reduced.

The programming assistance apparatus 4 may further include the display data generation part 121. The display data generation part 121 generates a display data to be displayed in a list display area in which a list of a plurality of task groups is displayed. When a first task group is selected among the plurality of task groups as a setting target in the list display area, the display data generation part 122 updates the display data in the first input area 220 to make the first task group a setting target to be set under the first condition. When a second task group is selected among the plurality of task groups as an execution target in the list display area, the display data generation part 123 updates the display data in the second input area 230 to add the second task group as a setting target to be set under the second condition. This configuration facilitates the selecting of task groups to be set under the first condition and the second condition. As a result, the burden of inputting desired conditions is further reduced.

While in the above-described embodiment circuitry is used to perform the functional modules, this configuration is not intended in a limiting sense; it is also possible to use a plurality of circuits to perform the respective functional modules.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot programming assistance apparatus comprising: circuitry configured to:

generate a first display data to be displayed in a first input area, the first input area being configured to receive an input, for each of a plurality of task groups, where each of the plurality of task groups includes a plurality of tasks and a first condition under which at least one robot executes the plurality of tasks;

generate a second display data to be displayed in a second input area, the second input area being configured to receive an input for a second condition which is an execution order in which the plurality of task groups are executed;

wherein the first input area and second input area are located adjacent to each other on a single display screen;

set the first condition based on the input into the first input area; set the second condition based on the input into the second input area; and generate, based on the first condition and the second condition, a motion program for causing the at least one robot to execute the plurality of task groups, wherein the first condition is a start condition and the start condition is a condition to be satisfied before execution of subsidiary task is started.

2. The robot programming assistance apparatus according to claim 1, wherein when the at least one robot to execute the plurality of tasks is specified in the first input area, the circuitry is configured to set the first condition to cause the at least one robot to execute the plurality of tasks, wherein when the at least one robot to execute the plurality of tasks is not specified in the first input area, the circuitry is configured to set the first condition to indicate that the at least one robot to execute the plurality of tasks is undetermined, and wherein when the at least one robot to execute the plurality of tasks is undetermined in the first condition, the circuitry is configured to set the at least one robot to execute the plurality of tasks.

3. The robot programming assistance apparatus according to claim 2, wherein when an execution of the plurality of task groups is specified with the execution order determined in the second input area, the circuitry is configured to set the second condition to maintain the execution order, wherein when the execution of the plurality of task groups is specified with the execution order undetermined in the second input area, the circuitry is configured to set the second condition to indicate that the execution order of the plurality of task groups is undetermined, and wherein when the execution order of the plurality of task groups is undetermined in the second condition, the circuitry is configured to set the execution order of the plurality of task groups.

4. The robot programming assistance apparatus according to claim 3, wherein when the execution order of the plurality of task groups is undetermined, the circuitry is configured to set the execution order of the plurality of task groups so that at least two task groups of the plurality of task groups are executed simultaneously, and wherein when the execution order is set so that the plurality of tasks are executed simultaneously while the at least one robot to execute the plurality of tasks is undetermined, the circuitry is configured to set a plurality of robots comprising the at least one robot to execute the plurality of tasks.

5. The robot programming assistance apparatus according to claim 4,
wherein when icons of the plurality of task groups are aligned in a first direction in the second input area, the circuitry is configured to set the second condition to maintain the execution order as an order in which the icons of the plurality of task groups are aligned, and
wherein when the icons of the plurality of task groups are aligned in a second direction generally perpendicular the first direction in the second input area, the circuitry is configured to set the second condition to indicate that the execution order of the plurality of task groups is undetermined.

6. The robot programming assistance apparatus according to claim 5, wherein the circuitry is configured to:
set, on an individual robot basis, a motion path between the plurality of tasks to be executed;
set, on the individual robot basis, a waiting time period to adjust motion timings of a plurality of robots comprising the at least one robot; and
determine whether to adopt previous settings regarding: the at least one robot to execute the plurality of tasks; the execution order of the plurality of task groups; on the individual robot basis, the motion path between the plurality of tasks to be executed; and, on the individual robot basis, the waiting time period to adjust the motion timings of the plurality of the robots, based on a preset evaluation condition.

7. The robot programming assistance apparatus according to claim 6, wherein the circuitry is configured to generate a third display data to be displayed on a time chart that shows, on the individual robot basis, a time period for an execution of the plurality of tasks, a time period for a movement along the motion path, and the waiting time period, wherein said generation of the third display data is based on the adoptable settings.

8. The robot programming assistance apparatus according to claim 4, wherein the circuitry is configured to:
set, on an individual robot basis, a motion path between the plurality of tasks to be executed;
set, on the individual robot basis, a waiting time period to adjust motion timings of the plurality of robots; and
determine whether to adopt previous settings regarding: the at least one robot to execute the plurality of tasks; the execution order of the plurality of task groups; on the individual robot basis, the motion path between the plurality of tasks to be executed; and, on the individual robot basis, the waiting time period to adjust the motion timings of the plurality of the robots, said determination based on a preset evaluation condition.

9. The robot programming assistance apparatus according to claim 8, wherein the circuitry is configured to generate a third display data to be displayed on a time chart that shows, on the individual robot basis, a time period for an execution of the plurality of tasks, a time period for a movement along the motion path, and the waiting time period, wherein said generation of the third display data is based on saved settings.

10. The robot programming assistance apparatus according to claim 8, wherein the circuitry is configured to generate a fourth display data to be displayed as a moving image of a motion of the at least one robot in a period selected on the time chart.

11. The robot programming assistance apparatus according to claim 3, wherein the circuitry is configured to:
set, on an individual robot basis, a motion path between the plurality of tasks to be executed;
set, on the individual robot basis, a waiting time period to adjust motion timings of a plurality of robots comprising the at least one robot; and
determine whether to adopt previous settings regarding: the at least one robot to execute the plurality of tasks; the execution order of the plurality of task groups; on the individual robot basis, the motion path between the plurality of tasks to be executed; and, on the individual robot basis, the waiting time period to adjust the motion timings of the plurality of the robots, based on a preset evaluation condition.

12. The robot programming assistance apparatus according to claim 11, wherein the circuitry is configured to generate a third display data to be displayed on a time chart that shows, on the individual robot basis, a time period for an execution of the task, a time period for a movement along the motion path, and the waiting time period, the third data being based on a setting determined as adoptable by the circuitry.

13. The robot programming assistance apparatus according to claim 12, wherein the circuitry is configured to generate a fourth display data to be displayed as a moving image of a motion of the at least one robot, in a period selected on the time chart.

14. The robot programming assistance apparatus according to claim 1,
wherein the circuitry is configured to generate a fifth display data to be displayed in a list display area in which a list of the plurality of task groups is displayed,
wherein when a first task group is selected among the plurality of task groups as a setting target in the list display area, the circuitry is configured to update the first display data in the first input area to make the first task group a setting target to be set under the first condition, and
wherein when a second task group is selected among the plurality of task groups as an execution target in the list display area, the circuitry is configured to update the second display data in the second input area to add the second task group as a setting target to be set under the second condition.

15. A robot system comprising: at least one robot; circuitry configured to:
generate a first display data to be displayed in a first input area, the first input area being configured to receive an input, for each of a plurality of task groups, where each of the plurality of task groups includes a plurality of tasks and a first condition under which the at least one robot executes the plurality of tasks;
generate a second display data to be displayed in a second input area, the second input area being configured to receive an input for a second condition which is an execution order in which the plurality of task groups are executed;
wherein the first input area and second input area are located adjacent to each other on a single display screen;
set the first condition based on the input into the first input area; set the second condition based on the input into the second input area;
generate, based on the first condition and the second condition, a motion program for causing the at least one robot to execute the plurality of task groups; and
a controller configured to control the at least one robot based on the motion program generated by the circuitry, wherein the first condition is a start condition and the start condition is a condition to be satisfied before execution of subsidiary task is started.

16. A method for generating a robot program, the method comprising:
generating a first display data to be displayed in a first input area, the first input area being configured to receive an input, for each of a plurality of task groups, where each of the plurality of task groups includes a plurality of tasks and a first condition under which at least one robot executes the plurality of tasks;
generating second display data to be displayed in a second input area, the second input area being configured to receive an input for a second condition which is an execution order in which the plurality of task groups are executed;
wherein the first input area and second input area are located adjacent to each other on a single display screen;
setting the first condition based on the input into the first input area;
setting the second condition based on the input into the second input area;
and generating, based on the first condition and the second condition, a motion program for causing the at least one robot to execute the plurality of task groups,
wherein the first condition is a start condition and the start condition is a condition to be satisfied before execution of subsidiary task is started.

17. A robot programming assistance apparatus comprising:
circuitry configured to:
generate a first display data to be displayed in a first input area, the first input area being configured to receive an input, for each of a plurality of task groups, where each of the plurality of task groups includes a plurality of tasks and a first condition under which at least one robot executes the plurality of tasks;
generate a second display data to be displayed in a second input area, the second input area being configured to receive an input for a second condition which is an execution order in which the plurality of task groups are executed;
wherein the first input area and second input area are located adjacent to each other on a single display screen;
set the first condition based on the input into the first input area;
set the second condition based on the input into the second input area;
generate, based on the first condition and the second condition, a motion program for causing the at least one robot to execute the plurality of task groups,
wherein the first condition is a start condition and the start condition is a condition to be satisfied before execution of subsidiary task is started
wherein when the at least one robot to execute the plurality of tasks is specified in the first input area, the circuitry is configured to set the first condition to cause the at least one robot to execute the plurality of tasks,
wherein when the at least one robot to execute the plurality of tasks is not specified in the first input area, the circuitry is configured to set the first condition to indicate that the at least one robot to execute the plurality of tasks is undetermined,
wherein when the at least one robot to execute the plurality of tasks is undetermined in the first condition, the circuitry is configured to set the at least one robot to execute the plurality of tasks, wherein when an execution of the plurality of task groups is specified with the execution order determined in the second input area, the circuitry is configured to set the second condition to maintain the execution order,
wherein when the execution of the plurality of task groups is specified with the execution order undetermined in the second input area, the circuitry is configured to set the second condition to indicate that the execution order of the plurality of task groups is undetermined,
wherein when the execution order of the plurality of task groups is undetermined in the second condition, the circuitry is configured to set the execution order of the plurality of task groups, wherein when icons of the plurality of task groups are aligned in a first direction in the second input area, the circuitry is configured to set the second condition to maintain the execution order as an order in which the icons of the plurality of task groups are aligned, and wherein when the icons of the plurality of task groups are aligned in a second direction generally perpendicular to the first direction in the second input area, the circuitry is configured to set the second condition to indicate that the execution order of the plurality of task groups is undetermined.

18. The robot programming assistance apparatus according to claim 17, wherein the circuitry is configured to:
set, on an individual robot basis, a motion path between the plurality of tasks to be executed;
set, on the individual robot basis, a waiting time period to adjust motion timings of a plurality of robots comprising the at least one robot; and
determine whether to adopt previous settings regarding: the at least one robot to execute the plurality of tasks; the execution order of the plurality of task groups; on the individual robot basis, the motion path between the tasks to be executed; and, on the individual robot basis, the waiting time period to adjust the motion timings of the plurality of the robots, based on a preset evaluation condition.

19. The robot programming assistance apparatus according to claim 18, wherein the circuitry is configured to generate a third display data to be displayed on a time chart that shows, on the individual robot basis, a time period for an execution of the plurality of tasks, a time period for a movement along the motion path, and the waiting time period, wherein said generation of the third display data is based on the adoptable settings.

20. The robot programming assistance apparatus according to claim 18, wherein the circuitry is configured to generate a fourth display data to be displayed as a moving image of a motion of the at least one robot in a period selected on the time chart.

* * * * *